US008660684B2

(12) United States Patent
Mundt et al.

(10) Patent No.: US 8,660,684 B2
(45) Date of Patent: Feb. 25, 2014

(54) METHOD OF REMOVING STOCK MATERIAL FROM A WORKPIECE BY MACHINING WITH A TOOL

(75) Inventors: Eric G. Mundt, Rochester, NY (US); Richard F. Culbert, Jr., Rochester, NY (US)

(73) Assignee: The Gleason Works, Rochester, NY (US)

(*) Notice: Subject to any disclaimer, the term of this patent is extended or adjusted under 35 U.S.C. 154(b) by 309 days.

(21) Appl. No.: 13/153,539

(22) Filed: Jun. 6, 2011

(65) Prior Publication Data

US 2011/0301742 A1 Dec. 8, 2011

Related U.S. Application Data

(60) Provisional application No. 61/351,635, filed on Jun. 4, 2010.

(51) Int. Cl.
*G06F 19/00* (2011.01)
*B23F 1/00* (2006.01)
*B23F 9/10* (2006.01)

(52) U.S. Cl.
USPC ........ 700/173; 700/159; 700/164; 29/893.35; 29/893.36; 409/10; 409/26

(58) Field of Classification Search
USPC ................. 700/159, 164–165, 173; 29/893.35–893.36; 407/20–28; 409/1, 409/8–10, 25–27, 43
See application file for complete search history.

(56) References Cited

U.S. PATENT DOCUMENTS

| 4,137,677 | A | * | 2/1979 | Nedreski .......................... 451/11 |
| 4,523,409 | A | * | 6/1985 | De Fazio ........................... 451/5 |
| 4,589,230 | A | * | 5/1986 | Yonemura et al. ............ 451/219 |
| 4,766,704 | A | * | 8/1988 | Brandestini et al. ............ 451/58 |
| 5,539,172 | A | * | 7/1996 | Takase et al. ................. 219/69.2 |
| 6,217,409 | B1 | * | 4/2001 | Stadtfeld et al. .................. 451/5 |
| 6,669,415 | B2 | * | 12/2003 | Stadtfeld et al. ............... 409/27 |
| 6,712,566 | B2 | | 3/2004 | Stadtfeld et al. |
| 6,808,438 | B1 | * | 10/2004 | Mavromichaelis ............... 451/5 |
| 6,808,440 | B2 | * | 10/2004 | Mundt .......................... 451/48 |
| 7,153,190 | B2 | * | 12/2006 | Mavro-Michaelis ............. 451/8 |

(Continued)

FOREIGN PATENT DOCUMENTS

| CH | 574296 | A5 | 4/1976 |
| FR | 2135960 | A5 | 12/1972 |
| GB | 1349563 | | 4/1974 |
| GB | 2146457 | A | 4/1985 |

OTHER PUBLICATIONS

International Search Report and Written Opinion for PCT/US2011/039211 issued by EPO as ISA.

*Primary Examiner* — Ramesh Patel
(74) *Attorney, Agent, or Firm* — Robert L. McDowell

(57) ABSTRACT

A method of determining a desired power level (P) as a function of relative tool to workpiece position, thereby enabling adaptive control advantages that were previously inaccessible for machining, such as bevel gear grinding, from solid applications. Preferably, set point power is expressed as a function of specific power (P', P'') and roll position (Q) for a generated gear or as a function of specific power and plunge position for a non-generated (i.e. Formate) gear. Specific power is defined and preferably remains as defined during machining even as process conditions vary during machining.

13 Claims, 8 Drawing Sheets

(56) References Cited

U.S. PATENT DOCUMENTS

| | | | |
|---|---|---|---|
| 7,297,046 B2 * | 11/2007 | Mavro-Michaelis | 451/5 |
| 7,527,548 B2 * | 5/2009 | Bittner et al. | 451/47 |
| 2003/0148717 A1 * | 8/2003 | Mundt | 451/48 |
| 2005/0026548 A1 * | 2/2005 | Mavro-Michaelis | 451/5 |

* cited by examiner

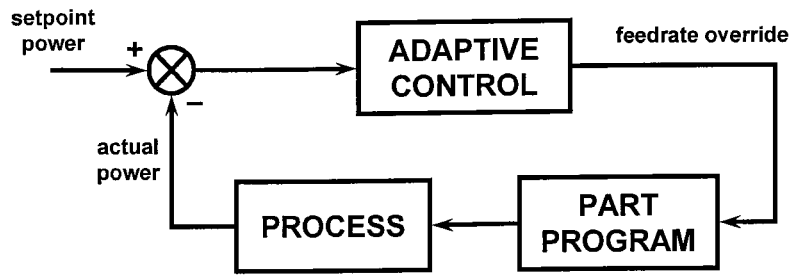
Figure 1: Conventional adaptive control system
(Prior Art)
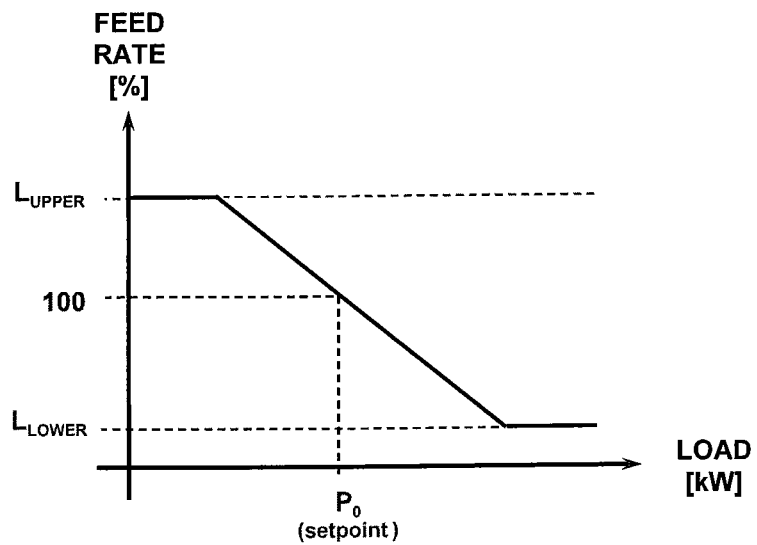
Figure 2: Typical adaptive control function
(Prior Art)

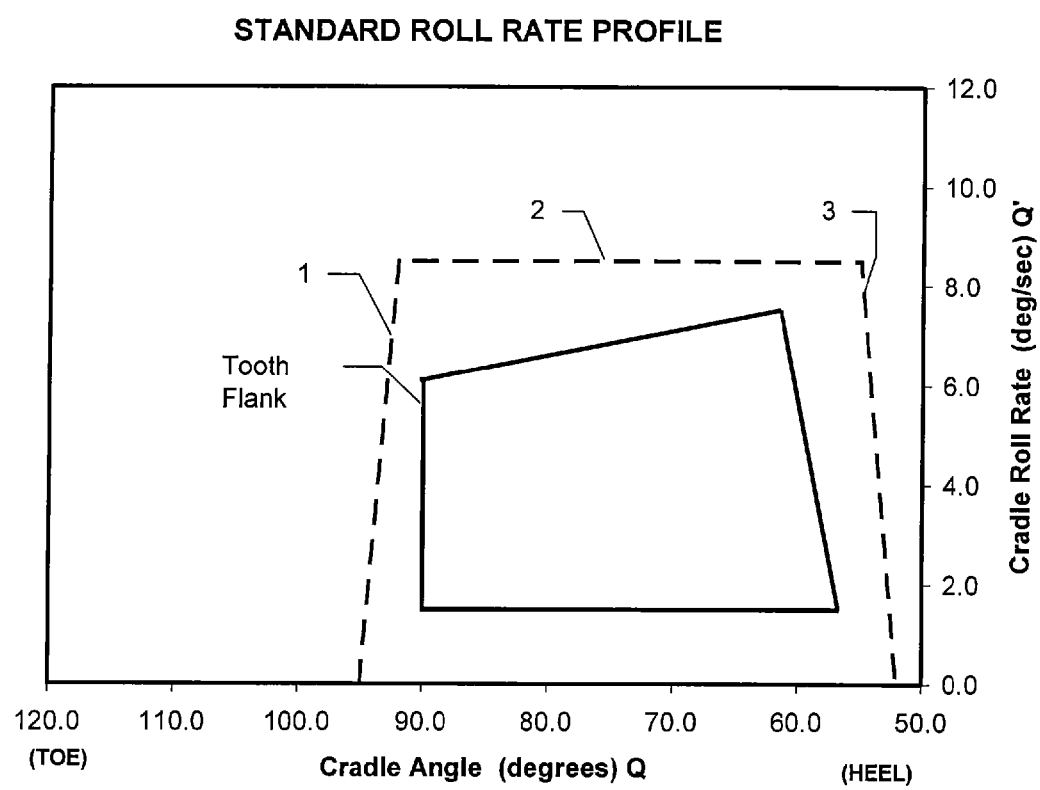
Figure 3: Example of roll rate profile for hard-finish grinding

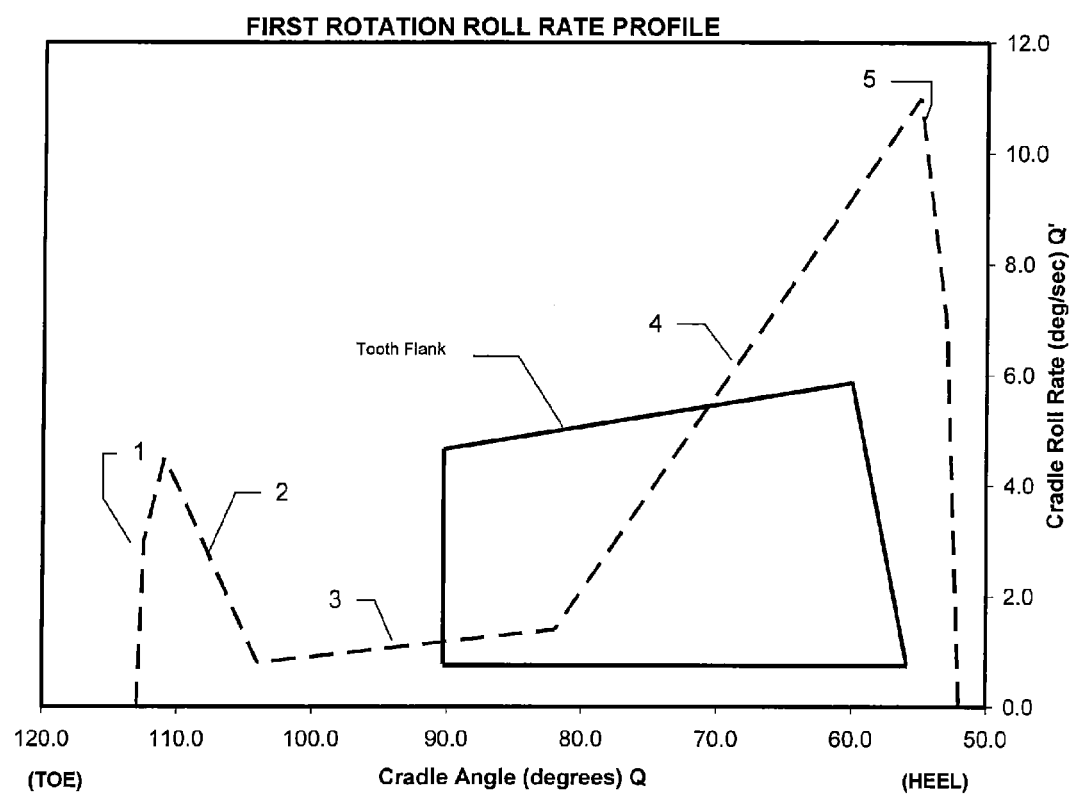
Figure 4: Example of roll rate profile for grinding from solid

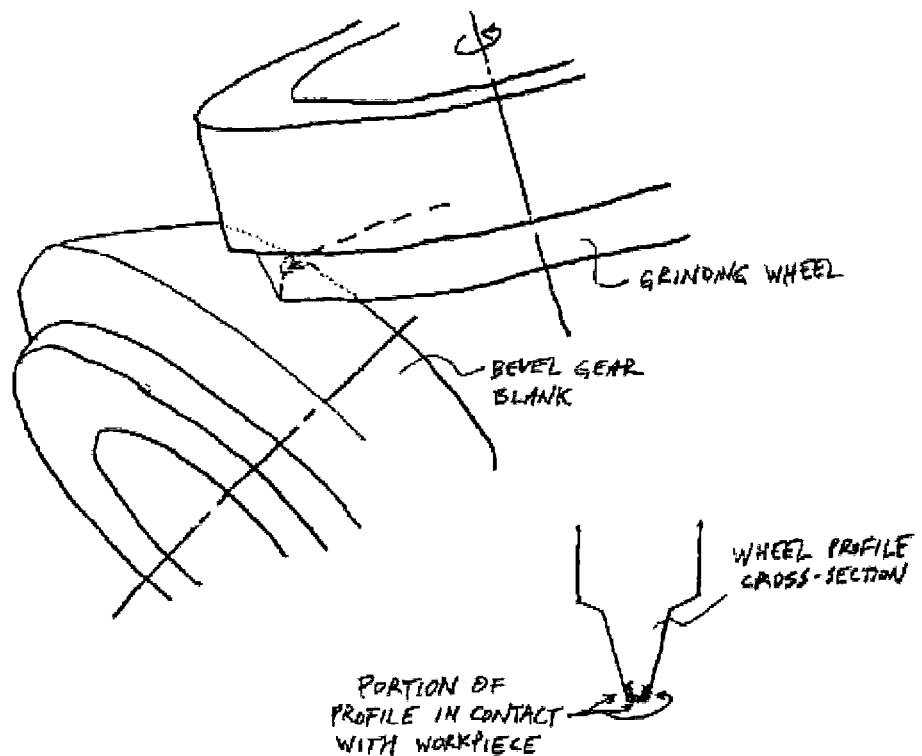
Figure 5: Tool engagement, first contact at toe
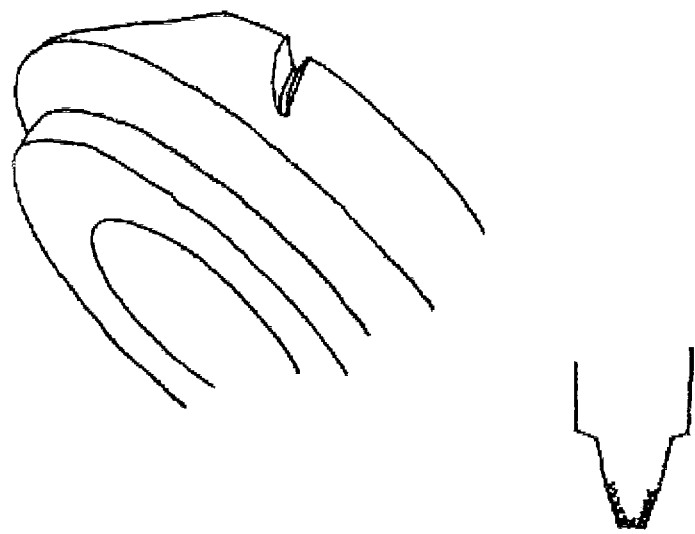
Figure 6: Tool engagement, 30% of roll path complete

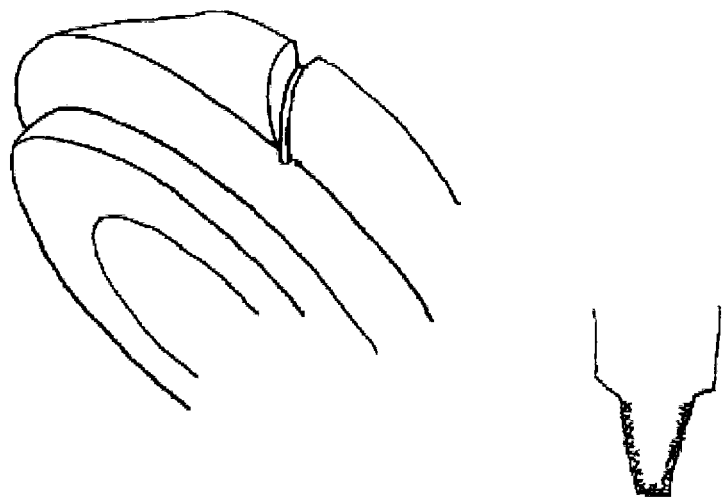
Figure 7: Tool engagement, 60% of roll path complete
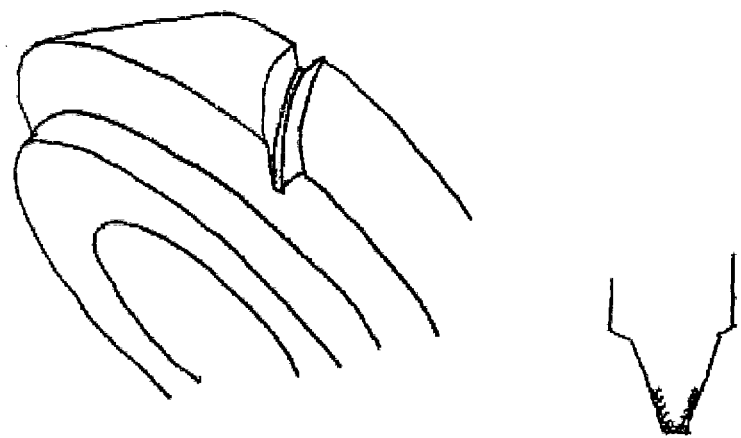
Figure 8: Tool engagement, 90% of roll path complete

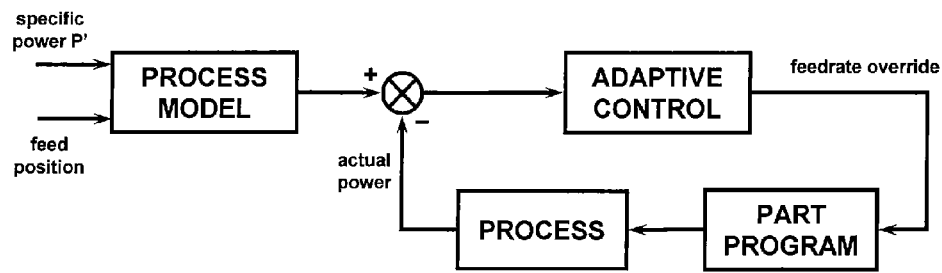
Figure 9: Inventive adaptive control system
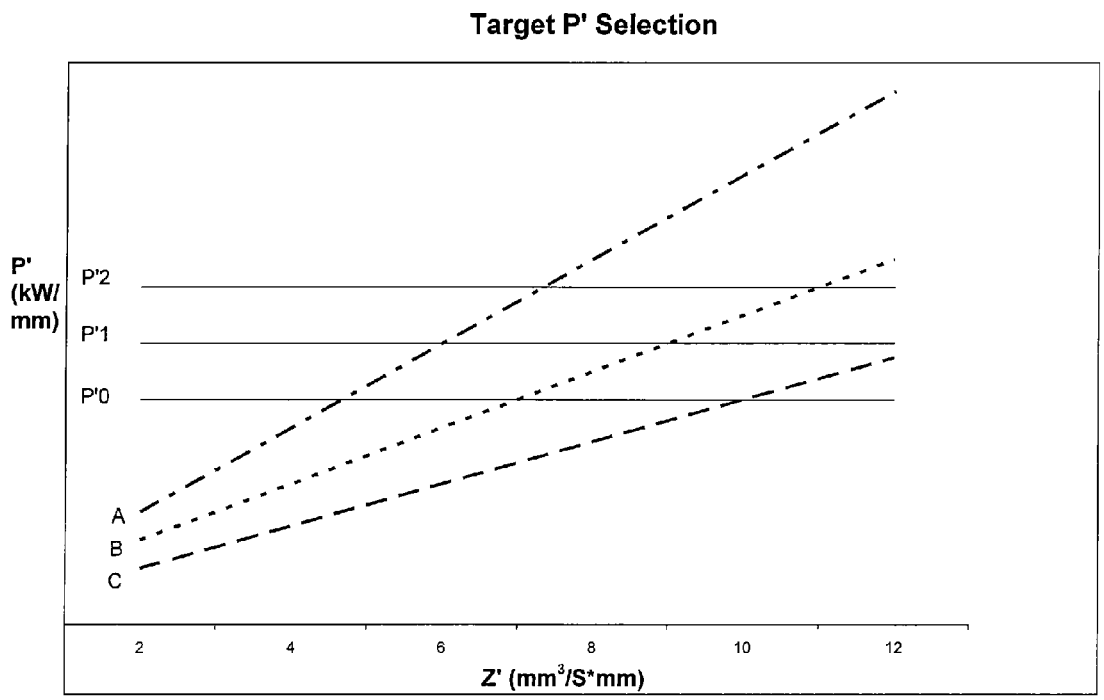
Figure 10: Target P' selection

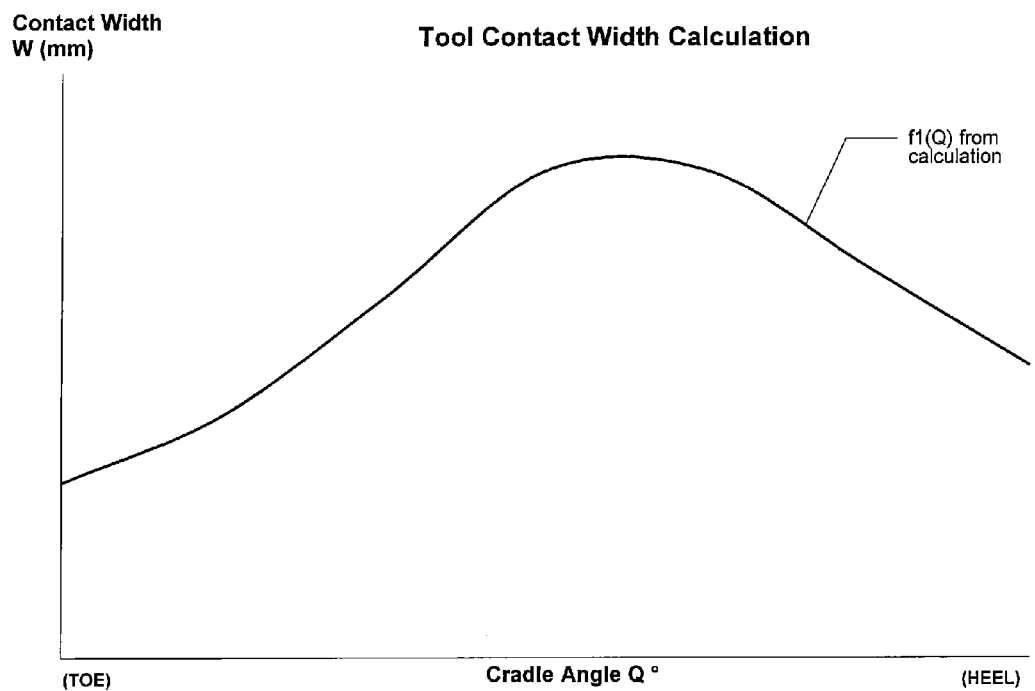
Figure 11: Tool contact width calculation

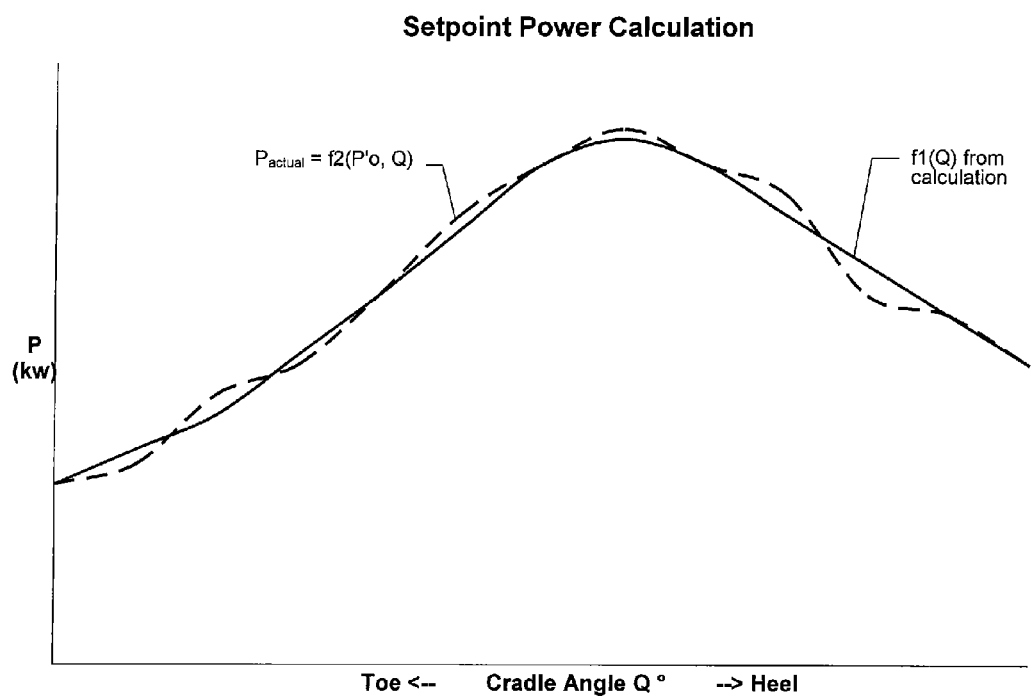
Figure 12: Setpoint power calculation

METHOD OF REMOVING STOCK MATERIAL FROM A WORKPIECE BY MACHINING WITH A TOOL

This application claims the benefit of U.S. Provisional Patent Application No. 61/351,635 filed Jun. 4, 2010, the entire disclosure of which is hereby incorporated by reference.

FIELD OF THE INVENTION

The present invention relates to a method for determining a variable adaptive control set point as a function of relative tool to workpiece position in a machine tool carrying out a metal removal process.

BACKGROUND OF THE INVENTION

Adaptive control generally refers to a special type of control system capable of modifying its algorithms to better regulate physical systems which have time varying or uncertain dynamics. Such systems typically employ advanced nonlinear feedback or feed-forward approaches, and usually involve some sort of learning technique, whereby the control analyzes collective feedback and improves system performance over time.

In the machine tool industry, however, adaptive control refers to a relatively simple strategy whereby the machine control adjusts machining feed rate depending on tool spindle feedback (typically, for example, bulk power, torque or current) in order to maintain constant load. Adaptive control is the automated equivalent of a human operator who observes the power level during the process and adjusts the feed rate override setting up or down to maintain a desired power level. Of course the adaptive control system performs this function more reliably and with faster reaction time than a human being.

Adaptive control systems have been known in the machine tool world for several decades. Presently, adaptive control is commercially available through most major computer numerical control (CNC) producers and from many other so-called third party suppliers. Benefits to the machine tool user include greater process stability in cases where workpiece material, tool condition, or other process conditions vary over time, reduced danger of tool and workpiece damage, reduced requirement for human intervention, and reduced setup and process optimization effort.

Adaptive control systems can usually be turned on or off during the machining process, and typically allow the user to program different set point values for different tools or machining operations within a cycle, such as would be advantageous for a universal machining center with automatic tool changer. Provided that key process conditions, such as engagement length or area of the tool in contact with the workpiece, coolant application, etc. are relatively constant during the machining process, bulk tool spindle power yields a reasonable measure of process health. In this case, present day adaptive control systems offer the above mentioned benefits.

A block diagram representing a typical adaptive control system appears in FIG. 1. Set point power is the main command input, which is compared with power measured from the process. The difference between command and feedback power is calculated, filtered if necessary, and fed into the adaptive control block. The output of the adaptive control system is a feed rate override value, which is used to modify machining feed rates of the part program in real time, such that the actual machining process power is regulated as closely as possible to the programmed set point.

FIG. 2 shows a simplified adaptive control function, which could be implemented within the "adaptive control" block of FIG. 1. This function would be applied for at least one tool or operation of a machining cycle. In this diagram, bulk power measured by the system is indicated along the horizontal axis. The feed rate override output is given along the vertical axis. At the programmed set point value $P_0$, the feed rate override value is 100%. As the process power becomes larger, for example due to hard spot in workpiece material or decreasing tool sharpness, the system reduces the feed rate. As the measured power gets smaller, the system increases the override percentage. The adaptive control function shown in FIG. 2 is linear, but does not have to be. Typical adaptive control systems allow the user to specify upper and lower feed rate override limits, as shown in the diagram.

Adaptive control has not seen wide acceptance in gear manufacturing processes such as bevel gear grinding, bevel gear cutting, and stick blade grinding. The primary reason is that the degree of tool engagement in the workpiece varies continuously in bevel gear manufacturing processes. Controlling bulk power to a constant level would create drastically changing load per grit in the grinding wheel (or load per unit cutting edge length in the cutting tool), whereas process optimization seeks to find the highest constant load per grit (or per unit cutting edge length in a cutting tool). Therefore to be effective, an adaptive control system which measures tool spindle power would additionally require knowledge of tool engagement. However, known adaptive control systems are not capable of directly measuring and processing this additional information, and so are not able to provide the normally expected benefits in bevel applications.

One approach to work around limitations of known adaptive control systems in bevel manufacturing applications would be to divide the machining cycle into small segments with different adaptive control set point values. This approach could be effective for bevel gears, but there is no known method other than trial and error to calculate the different set point values. The adaptive control system would thus require time consuming and tedious tuning for every different part geometry, and would require a high degree of operator expertise, thus defeating the purpose of adaptive control.

Also known in the art are simulation software systems which optimize the tool path in an attempt to stabilize tool load. Such systems have knowledge of the tool engagement in the workpiece, so tool path (depth and angle of cutting) as well as feed rate adjustments can be made in the machining part program to maintain constant load. A limitation of such simulation systems is that they do not work in real time, and thus cannot compensate for typical manufacturing environment variation, such as tool wear, material and geometry variation of tool or workpiece, and machine setup changes due to human variation. Another problem is that known simulation systems are only capable of optimizing tool path for processes that use tools with defined cutting edges, i.e. the software lacks capability to deal with material removal processes with undefined tool edges, such as grinding.

SUMMARY OF THE INVENTION

The present invention is directed to determining a desired power level as a function of relative tool to workpiece position, thereby enabling adaptive control advantages that were previously inaccessible for machining such as bevel gear grinding from solid applications. Preferably, set point power is expressed as a function of specific power and roll position for a generated gear or as a function of specific power and plunge position for a non-generated (i.e. Formate) gear. Specific power is defined and preferably remains as defined during machining even as process conditions vary during machining.

BRIEF DESCRIPTION OF THE DRAWINGS

FIG. 1 illustrates a conventional adaptive control system.

FIG. 2 shows a typical adaptive control function.

FIG. 3 shows an example of a roll rate profile for hard-finish grinding of a pre-cut bevel gear.

FIG. 4 illustrates an example of a roll rate profile for grinding-from-solid of a bevel gear.

FIG. 5 illustrates initial tool-workpiece engagement at toe-end of workpiece in grinding-from-solid of bevel gear.

FIG. 6 shows tool-workpiece engagement at about 30% completion of roll path in grinding-from-solid of bevel gear.

FIG. 7 shows tool-workpiece engagement at about 60% completion of roll path in grinding-from-solid of bevel gear.

FIG. 8 shows tool-workpiece engagement at about 90% completion of roll path in grinding-from-solid of bevel gear.

FIG. 9 illustrates the adaptive control system in accordance with the present invention.

FIG. 10 is a graphical representation of the relationship between specific power, P', specific metal removal rate, Z', and process conditions.

FIG. 11 is a graphical representation of a tool contact width calculation.

FIG. 12 is a graphical representation of a setpoint power calculation.

DETAILED DESCRIPTION OF THE PREFERRED EMBODIMENT

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

Bevel gears are usually manufactured by non-generating and/or generating machining processes performed on computer controlled machines such as those disclosed in U.S. Pat. No. 6,669,415 or U.S. Pat. No. 6,712,566, the disclosures of which are hereby incorporated by reference. In a non-generating process (utilizing a circular face milling cutting tool or a cup-shaped grinding wheel, for example), tooth slots are formed by feeding a rotating tool into a workpiece to a predetermined depth, withdrawing the tool, and indexing the workpiece to another (usually the next) tooth slot position. The steps of feeding, withdrawing and indexing are repeated until all tooth slots are formed. The profile shape of a tooth on a workpiece is produced directly from the profile shape on the tool.

A generating process may be performed wherein once the tool (e.g. circular face milling tool or cup-shaped grinding wheel) is fed to a predetermined depth, the tool and workpiece are then rolled together in a predetermined relative rolling motion, known as the generating roll or the cradle roll, as though the workpiece were rotating in mesh with a theoretical generating gear, the teeth of the theoretical generating gear being represented by the stock removing surfaces of the tool. The profile shape of the tooth is formed by relative motion of the tool and workpiece during the generating roll. The steps of feeding, rolling, withdrawing and indexing are repeated for each tooth slot until all tooth slots are formed.

Grinding bevel gears from the solid is becoming increasingly popular. For small batch size production, setup time is critical to manufacturing economics. Grinding wheels are readily available with short lead times, and may be profiled quickly to the required geometry, unlike conventional circular bevel gear cutting tools. Thus, grinding is very advantageous relative to setup economics. Due to recent advances in abrasive technology, material removal rates approaching those of cutting are now possible with grinding. The net effect of these two factors is that grinding from solid can be more economical than the conventional cutting process in a growing number of cases.

In addition to short run process economics, many gear manufacturers who aim to produce small volumes of ground gear sets are finding that ownership of both cutting and grinding machines is prohibitively expensive. For such manufacturers, grinding from solid may provide an attractive means to perform both semi-finishing and hard-finishing operations without a large financial investment.

Even more so than for finish grinding of a hardened gear, tool engagement conditions change radically during bevel gear grinding from solid. Tool engagement in this context means the fraction of tool cross-sectional profile engaged with the workpiece, as well as the length of tool-workpiece contact in the direction of tool rotation. For this reason it is difficult to set process conditions to get the most aggressive material removal possible without causing tool wear, burning, or other problems. State of the art grind-from-solid cycles for generated gears are typically arranged in two or three rotations, where in each rotation, the slots are ground with a non-standard cradle roll rate vs. cradle roll position profile. In order to deal with the radically changing tool engagement conditions, the feed rate profile usually involves several ramp segments. The feed rate profile is generally different for each rotation.

It should be understood that in the context of the present invention, a "rotation" of a work piece is achieved when a specified amount of stock material has been removed from each tooth slot. For example, a first rotation of grinding may remove 80% of the desired stock material from each tooth slot while a subsequent second rotation of grinding may remove the remaining 20% of the desired stock material from each tooth slot. A three-rotation grinding cycle may, for example, remove stock material from all tooth slots in respective successive amounts of 60%, 30% and 10%.

The dotted line of FIG. 3 shows an example of a typical feed rate profile that would be appropriate for hard-finishing a generated gear. Acceleration and deceleration sections, denoted (1) and (3), should not occur during actual machining. While the grinding wheel is in contact with the workpiece, the cradle roll rate profile is a constant function, section (2). A representative tooth flank is also drawn in FIG. 3 to show the relationship of cradle roll position to the tooth flank.

To illustrate the relative complexity, FIG. 4 shows an example of a typical roll rate profile for one rotation of a grind-from-solid cycle for the same gear as in FIG. 3. Due to the absence of a semi-finished slot in the grinding-from-solid case (at least the first rotation), additional cradle roll travel is required since tool-workpiece contacts occurs earlier in a grind-from-solid process due to the absence of the semi-finished tooth slot. This explains why there is approximately 20° more toe end roll for the grinding from solid example (FIG. 4) versus the hard-finishing example (FIG. 3). Acceleration and deceleration sections are denoted (1) and (5), respectively. Material is machined to form the bevel gear slot in sections (2)-(4). These sections are ramped in such a manner as to create reasonably constant load per grit of the grinding wheel.

Presently, it is possible to somewhat optimize grind-from-solid applications such as by determining a reasonably successful cradle roll speed profile. However, the process for optimization is a manual process, depends greatly on operator knowledge and is very time-consuming. The cycle conditions are furthermore job dependent, so in practice, a lengthy optimization process needs to be carried out for each different gear geometry. In addition to cumbersome initial setup, manufacturing environment changes may require re-tuning a cycle that was optimized at an earlier time. All of these factors are especially problematic in production environments with small batch sizes and large variety of jobs—exactly the class of gear producer for which grinding-from-solid poses advantages.

Direct application of adaptive control, as explained above, would not improve the situation for grinding bevel gears from solid. The reason is that adaptive control has no knowledge of the drastically changing tool engagement conditions. A more robust, less operator knowledge-intensive setup, optimization, and monitoring method would be very desirable for the grinding from solid process.

As stated above, the present invention is directed to determining the desired power level as a function of relative tool to workpiece position, thereby enabling adaptive control advantages that were previously inaccessible for machining such as bevel gear grinding-from-solid applications. Preferably, set point power is expressed as a function of roll position for a generated gear or as a function of plunge position for a non-generated (i.e. Formate) gear. This function may be used in conjunction with adaptive control systems such that a conventional grinding-from-solid process may be enhanced to provide among other things:

simpler and faster process optimization
shorter setup times
less required operator knowledge
less required human intervention
greater robustness and/or stability which is particularly helpful for small batch production with large variety of jobs.

In grinding from solid applications, the degree of tool engagement in the workpiece changes as the slot is machined. The engagement changes can be quantified in terms of contact width changes, where contact width is defined as the effective width of the tool cross section in contact with the bevel gear slot surfaces at a given point in time.

FIGS. 5-8 show tool engagement variation in a typical grind from solid scenario as the tooth slot is ground from the toe end of the tooth slot to the heel end of the tooth slot. The cup-shaped wheel position near the beginning of the machine cradle roll motion is shown relative to the workpiece in FIG. 5. For clarity the wheel is not shown in successive roll positions of FIGS. 6-8. In each diagram a cross-sectional view of the tool profile is depicted showing the effective portion of tool profile engaged with the workpiece at that moment in time. The length of tool profile engagement in the cross section view is considered the contact width. Although the instantaneous contact between the tool and work generally occurs at locations that vary about the tool axis, the contact may be treated as if it occurs in a single cross sectional plane. This is a generally accepted simplification which does not compromise physical meaning.

The contact width can be calculated as a function of relative tool to workpiece position. In the case of generated bevel gears, relative tool/work position is equivalent to cradle roll position. Therefore the function can be expressed in general terms as:

$$W = f_1(Q) \tag{1}$$

where:
W=the effective contact width
Q=the cradle roll position.

In practice, such a function may be derived by the same or similar programs that calculate the bevel gear machine settings, such programs being known to the skilled artisan and readily available.

A primary objective of the invention is to determine adaptive control set point power as a function of relative tool to workpiece position, such that the normalized load on the tool can be maintained at a constant, maximum level. Another objective is to provide a method which allows reliable grinding process enhancement without depending on a complicated, multi-variable process model. To achieve these objectives, the present invention prefers to take advantage of specific power, which is a grinding characteristic often used to evaluate grinding process health or to optimize the process.

Specific power, denoted P', is defined as power normalized by the grinding wheel to workpiece contact width. It is a measure of grinding process performance, and may be used to configure a grinding process to remove material as aggressively as possible while avoiding problems such as thermal damage or excessive wheel wear. The relationship of power to specific power may be expressed as:

$$P = f_2(P', W) \tag{2}$$

It is possible to select a specific power value P' to obtain a high performance grinding process, and contact width may be determined as a function of cradle roll position. Combining these facts allows derivation of a function which yields the desired power level as a function of roll position. In other words, $P = f_2(P', W)$, and $W = f_1(Q)$, so:

$$P = f_2(P', f_1(Q)) = f_2(P', Q) \tag{3}$$

FIG. 9 illustrates how this function may be coupled with an adaptive control system to provide an effective solution for grinding from solid. FIG. 10 shows how a target specific power value may be selected for the grinding from solid process. In FIG. 10, specific power values $P'_0$, $P'_1$, $P'_2$ are shown versus specific metal removal rate, Z', in conjunction with characterization curves (A, B, C) representing different process conditions (e.g. grinding wheel, wheel speed, dressing parameters, tool-workpiece contact length, tool-workpiece contact width, tool-workpiece contact area, equivalent chip thickness, other tool-workpiece contact conditions, coolant application conditions, etc.), such process conditions being evident to the skilled artisan. $P'_0$ represents a specific target value P' for maintaining a robust grinding-from-solid process while the area above specific power level $P'_1$ signifies excessive wheel wear and the area above specific power level $P'_2$ is indicative of thermal damage to the grinding wheel and/or the part being ground. It can be seen that as process conditions change (i.e. from A to B to C), the specific metal removal rate, Z', can increase while maintaining the desired specific power value $P'_0$.

FIG. 11 shows an example of the contact width function calculated for a specific gear. FIG. 12 illustrates an example of a resultant power function that may be used to feed an adaptive control. FIG. 12 also illustrates an example of an actual power curve resulting from the inventive method.

$P_{actual}$ represents the actual power maintained during grinding-from-solid with adaptive control and function $P=f_2(P'_0, Q)$.

While the inventive method discussed above uses specific power and contact width to provide an optimized adaptive control system, the specific power metric may alternatively be normalized by contact area. In this case the area normalized specific power metric is denoted P", and the area A. The power function is determined in a manner analogous to the previously discussed power function determined in accordance with contact width. Thus in the previously described example of a generated grinding from solid application, equations (1), (2), and (3) become, respectively:

$$A = f_3(Q) \quad (4)$$

$$P = f_4(P'', A) \quad (5)$$

$$P = f_4(P'', f_3(Q)) = f(P'', Q) \quad (6)$$

The area normalized power metric includes consideration of effective contact length and therefore may offer advantages for some applications.

The foregoing description of the present invention suggests an approach whereby a single P' or P" value is selected for use in the power calculation function. Although this might be practical and sufficient in many applications, the invention also includes the possibility to vary the target specific power over the tool path. This may have advantages, for instance in difficult generated gear grinding cases where the effectiveness of the coolant application differs significantly as a function of generating roll position.

The foregoing descriptions may be applied to form ground (non-generated) gears as well. Plunge rates and plunge depth position replace cradle roll rate and roll position (cradle angle) in the form grinding case (see FIGS. 3-4 and 11-12). Although the plunge velocity profiles have different shapes than corresponding roll rate profiles for hard-finish and grinding from solid cases, the same principles of varying process conditions apply.

The preferred application of the present invention is grinding of bevel gears from solid. The term bevel gears is understood to include all of the known types of pinions and gears which transmit rotation energy across non-parallel shafts, including spiral bevel, hypoid, zero angle spiral bevel (e.g. Zerol) and straight bevel designs. Grinding from the solid refers to the process whereby entire slots are formed in a soft gear blank via grinding. Grinding from the solid is performed most commonly as a semi-finishing process prior to heat treatment. In cases involving small batch sizes, or where cutting tools and/or cutting machine is not readily available, grinding from solid can be more economical than the conventional cutting process.

Although grinding from the solid (i.e. a gear blank) is the preferred application for the present invention, grinding pre-slotted, hardened gears is also contemplated by the present invention. Furthermore, the invention is applicable to other gear related processes, such as cutting blades and cutting blade blanks (e.g. stick blade grinding) and bevel gear cutting.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of removing stock material from a workpiece by machining with a tool at a rate of removal, said method comprising:
   providing a specific power value for said machining of said workpiece;
   engaging said workpiece and said tool;
   removing stock material from said workpiece, wherein during said removing stock material, machining process conditions vary,
   adjusting said rate of removal as said machining process conditions vary, said specific power value remaining essentially as provided during said adjusting.

2. The method of claim 1 wherein a varying machining process condition is tool to workpiece contact width.

3. The method of claim 1 wherein a varying machining process condition is tool to workpiece contact area.

4. The method of claim 1 wherein said workpiece comprises a gear blank or a pre-slotted gear.

5. The method of claim 1 wherein said machining method is a generating method.

6. The method of claim 5 wherein for a generating machining method, power level (P) for said machining is defined as:

$$P = f(P', W) = f(P', Q)$$

where:
P'=specific power
W=contact width
Q=cradle roll position.

7. The method of claim 5 wherein for a generating machining method, power level (P) for said machining is defined as:

$$P = f(P'', A) = f(P'', Q)$$

where:
P"=specific power
A=contact area
Q=cradle roll position.

8. The method of claim 1 wherein said machining method is a non-generating method.

9. The method of claim 1 wherein said machining method comprises grinding.

10. The method of claim 1 wherein said machining method comprises cutting.

11. The method of claim 1 wherein said specific power is constant during said machining.

12. The method of claim 1 wherein said specific power is varied during said machining.

13. The method of claim 1 wherein said workpiece comprises a cutting blade or a cutting blade blank.

* * * * *